United States Patent
Duling et al.

[15] 3,692,750
[45] Sept. 19, 1972

[54] PROCESS FOR PREPARING POLYAMIDES

[72] Inventors: Irl N. Duling, West Chester; Gary L. Driscoll, Boothwyn, both of Pa.; Robert E. Moore, Wilmington, Del.

[73] Assignee: Sun Oil Company, Philadelphia, Pa.

[22] Filed: Sept. 25, 1970

[21] Appl. No.: 75,743

Related U.S. Application Data

[63] Continuation-in-part of Ser. No. 542,229, April 13, 1966, abandoned.

[52] U.S. Cl. .........260/78.4 N, 260/47 CZ, 260/78 R
[51] Int. Cl. ...............................................C08g 20/00
[58] Field of Search........260/47 CZ, 78, 784, 78.4 N

[56] References Cited

UNITED STATES PATENTS

| | | | |
|---|---|---|---|
| 2,628,216 | 2/1953 | Magat | 260/78 |
| 2,628,218 | 2/1953 | Magat | 260/78 |
| 3,053,907 | 9/1962 | Smith et al. | 260/644 |
| 3,296,201 | 1/1967 | Stephens | 260/47 |
| 3,296,218 | 1/1967 | Ramp | 260/78 |
| 3,301,827 | 1/1967 | Martin | 260/78 |
| 3,329,653 | 7/1967 | Beavers et al. | 260/47 |

*Primary Examiner*—William H. Short
*Assistant Examiner*—L. L. Lee
*Attorney*—George L. Church, Donald R. Johnson, Wilmer E. McCorquodale, Jr. and John F. McNally

[57] ABSTRACT

Polyamides are produced by reacting an organic dinitrile with adamantane and alkyl-adamantane compounds having two substituents selected from the group consisting of chlorine, bromine and hydroxy in the presence of a strong sulfuric acid corresponding to 99.5–118% $H_2SO_4$ equivalent or polyphosphoric acid.

9 Claims, No Drawings

PROCESS FOR PREPARING POLYAMIDES

CROSS REFERENCE TO RELATED APPLICATIONS

This application is a continuation-in-part of our application Ser. No. 542,229 filed Apr. 13, 1966 now abandoned.

BACKGROUND OF THE INVENTION

1. Field of the Invention

The present invention relates to novel polyamides and the method of their preparation. More particularly, the invention relates to copolymers of certain substituted adamantanes and dinitriles and the process for their preparation.

2. Description of the Prior Art

Previously polyamides have been produced by the "Ritter reaction" wherein concentrated sulfuric up to fuming or slightly fuming sulfuric acid diluted with alcohol has been the reaction medium. In the present invention, however, the sulfuric acid concentration is from slightly less than fuming to strongly fuming sulfuric acid, 118 % $H_2SO_4$ equivalent being 80 percent fuming sulfuric. Under the conditions employed in the present reactions, the prior art polyamides would have been destroyed.

The reason for the overall stability of the present polyamides as compared to the prior art polyamides is the fact that the present polyamides have at most only one tertiary hydrogen attached at each adamantane moiety and preferably have no tertiary hydrogen atoms. Adamantane (tricyclo- [3.3.1.1$^{3,7}$] decane) has a carbon structure containing ten carbon atoms arranged in a completely symmetrical, strainless manner, wherein four of the carbon atoms are in bridgehead positions in the rings. The typographical structure of adamantane is often represented as:

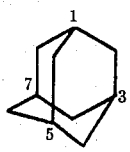

There are four tertiary hydrogen atoms, one at each bridgehead carbon atom. All four bridgehead carbon atoms are equivalent to each other and likewise all rings are equivalent.

The polyamides prepared according to the invention are substantially amorphous, linear polymers prepared from adamantane and alkyladamantanes containing two substituents selected from the group and suitable dinitriles. The substituted adamantane and alkyladamantanes include the dichloro, dibromo, dihydroxy, bromochloro, chlorohydroxy and bromohydroxy derivatives. The adamantane moiety when substituted for analogous hydrocarbons give new and unexpected properties to the resulting polyamides

SUMMARY OF THE INVENTION

The polyamides of the present invention are prepared from dichloro, dibromo, dihydroxy, bromochloro, chlorohydroxy or bromohydroxy derivatives of adamantane or alkyladamante, in which the halogen or hydroxy moieties are attached to the adamantene molecule at either bridgehead or non-bridgehead positions. The disubstituted compounds are reacted in the presence of highly concentrated acid with a dinitrile of the formula NC—R″—CN, where R″ is a bivalent organic radical or is non-existant. The reaction is conducted in the presence of sulfuric acid, having a concentration of 99.5 to 118 percent equivalent $H_2SO_4$ or polyphosphoric acid.

DESCRIPTION OF THE PREFERRED EMBODIMENTS

The alkyladamantane compounds include mono- and di-alkyl adamantane moieties, having the total number of alkyl carbon atoms in the range of 1-20 inclusive. The halide, hydroxy and alkyl substituents may be connected at either bridgehead or non-bridgehead positions.

A preferred class of reactants are those wherein the halide, hydroxy and alkyl substituents are attached to bridge-head carbon atoms so that no tertiary hydrogen remains in the adamantane molecule. The halides or hydroxys would be located at the 1-, 3-positions and alkyl groups, such as methyl, ethyl, propyl, butyl, decyl or the like, at the 5-, and 7- positions.

In the process of the present invention employing concentrated sulfuric acid, there have been found to be two competing reactions. The first is the polymerization reaction and the second an oxidative degradation caused by the concentrated sulfuric acid. At concentrations below 99.% $H_2SO_4$, the polymerization reaction proceeds so slowly that the oxidative degradation is predominate, thus no polymer is recoverable. When the sulfuric acid concentration is in the range of 99.5 to 118% $H_2SO_4$ equivalent, preferably 100.1 to 111% $H_2SO_4$ equivalents, the polymerization reaction proceeds at a much faster rate than the oxidative degradation, thus allowing recovery of the polymer.

At sulfuric acid concentrations above 118% $H_2SO_4$ equivalents, the reaction is extremely difficult to control, whereby the oxidative degradation again predominates and no polymer is recoverable.

The fuming sulfuric acid or polyphosphoric acid acts as a catalyst and dehydrating agent for the reaction and as a solvent for the reaction product. The polymer produced is of the type:

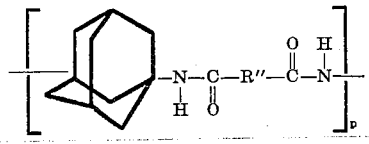

wherein R″ has the significance previously shown and p is a number in the range of 10–220. In the reaction the dinitrile becomes connected to the adamantane moieties at 1,3 positions regardless of whether the halide or hydroxy groups were attached at bridgehead positions or non-bridgehead positions. This result occurs because the fuming sulfuric or polyphosphoric acid causes isomerization of the non-bridgehead halide and hydroxy groups to bridgehead positions.

The dinitrile reacts at the site of the halide or hydroxy groups by what appears to be a carbonium ion mechanism which may be depicted as

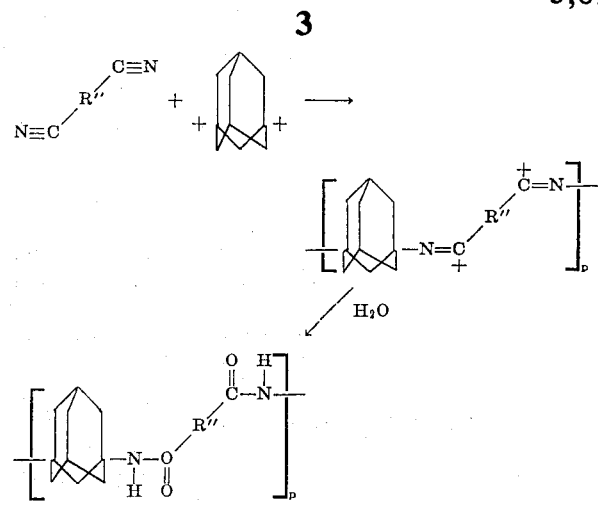

wherein R and $p$ have the significance previously shown.

The properties of the polyamides produced according to the present invention vary over a wide range depending on the molecular weight. It is, however, difficult to measure the average molecular weight of the present polyamides because of their limited solubility in suitable solvents. For this reason the inherent viscosity has been employed to characterize the polyamides. The inherent viscosity is indicative of the degree of polymerization and is used herein as a measure thereof. According to the present invention, polyamides can be produced having inherent viscosities in the range of 0.05 to 1.5 and preferably in the range of .5 to 1.2. As the inherent viscosity of the polyamides having structural repeating units of this invention decreases below 0.5 the brittleness of the film increases and the satisfactory toughness characteristics deteriorate. By analogy with the inherent viscosities of nylon and "Dacron" it is possible to estimate that the number average molecular weight of the polyamides are in the range of approximately 3,000–50,000 and 10,000 to 25,000 with respect to the inherent viscosity ranges above. Inherent viscosity is represented by the equation $$\eta \text{ inherent} = \ln \frac{\eta \text{ relative}}{C}$$

where $\eta$ relative $= t/t_o$ $t_o$ = flow time through a viscometer of a liquid reference.

$t$ = flow time through the same viscometer of a dilute solution of polymer in the reference liquid.

$C$ = concentration of polymer in solution.

Suitable solvents for the polyamide of the present invention include phenol-tetrachloroethylene, trifluoroacetic acid, fuming sulfuric acid and polyphosphoric acid.

The adamantane component of reaction mixture can be any dichloro, dibromo, dihydroxy, bromochloro, chlorohydroxy or bromohydroxy adamantane or alkyladamantane wherein said alkyl-adamantane contains 1–2 alkyl groups containing 1–20, and preferably 1–10, total carbon atoms and attached at either bridgehead or non-bridgehead positions.

Examples of such reactants are the dichloro, dibromo, dihydroxy, bromochloro, chlorohydroxy or bromohydroxy derivatives of the following hydrocarbons: adamantane; 1-methyl or 2-methyl-adamantane; 1-ethyl or 2-ethyladamantane; 1,2-dimethyl or 1,3-dimethyladamantane; 1-methyl-3-ethyl-adamantane; diethyl- adamantanes; 1-n-propyl or 1-isopropyl-adamantane; 1-n-butyl-adamantane; 1,3-di-n-pentyladamantane; 1-methyl-3-heptyladamantane; 1-n-decyladamantane; 1-n-decyl-3-ethyladamantane; 1-methyl-2-propyladamantane; 1-iso-hexyl-adamantane and the like.

The dihalo derivatives can be prepared by reacting the corresponding adamantane hydrocarbon with chlorine or bromine in the presence of $AlCl_3$ or $AlBr_3$ at a temperature in the range of 0°–300° C as disclosed in Stetter and Wulff German Pat. No. 1,101,410 and Stetter in Angew Chem. International Edit., Vol. 1 (1962), No. 6, pages 287–288.

The diols of adamantane and alkyladamantanes can be produced by reacting the parent hydrocarbon with chromic acid according to the procedure disclosed in U.S. Pat. No. 3,383,424, issued May 14, 1968 to Robert E. Moore.

The bromochloro derivative can be prepared by bromination and subsequent substitution of one bromine with chlorine according to the procedure disclosed in copending application of Driscoll and Moore, Ser. No. 688,679, filed Dec. 7, 1967 now U.S. Pat. No. 3,626,017 issued Dec. 7, 1971.

The chlorohydroxy and bromohydroxy derivatives can be prepared by reacting a halogenating agent which is a chloride, bromide or iodide of an alkali or alkaline earth metal, or a corresponding hydrogen halide in the presence of strong sulfuric acid at a temperature between the freezing point of the acid and 75°C. according to the procedure set forth in the copending application of Driscoll and Moore Ser. No. 784,480, filed Dec. 17, 1968.

Suitable dinitriles are those of the formula NC—R''—CN where R'' is bivalent organic radical or is nonexistant. The bivalent radical, R'', may be saturated or unsaturated aliphatic or alicyclic, aromatic or heterocyclic and may be substituted or unsubstituted said substituents being of the type that do not interfere with the linear polymerization reaction. Such substituents include ether, sulfide, ketone, amide, halogen and the like.

Some suitable dinitriles are:
cyanogen
succinonitrile
adiponitrile
fumaronitrile
malononitrile
glutaronitrile
pimilonitrile
suberonitrile
azelonitrile
sebaconitrile
dodencanedinitrile
hexahydrobenzodinitrile
hexahydroterephthalonitrile
terephthalonitrile
phthalonitrile
isophthalonitrile
4,4'-diphenyl dicarbonitrile
0-benzenediacetonitrile
4,4'-oxydibenzonitrile
2,4-pyridinedinitrile 2,5-furylacetodinitrile
beta-methyl adiponitrile
beta-ethyl adiponitrile
beta-phenyl adiponitrile
3-nitrophthalonitrile
2,5-dinitroterephthalonitrile and the like.

The polymerization reaction is usually carried out by first adding the adamantane reactant to the acid solvent-catalyst, then adding the dinitrile slowly with stirring and cooling. Alternatively, the adamantane and dinitrile may be mixed, then added to the acid slowly with stirring and cooling. After the polymerization reaction is completed, usually 2 to 24 hours, the reaction mixture is poured over ice and made alkaline. The polymer is separated and washed three to six times with water and once with a 1:1 mixture of acetone and methanol.

Normally, the mole ratio of adamantane to dinitrile is in the range of 0.5:1 to 3:1 and preferably 1:1. The reaction temperature when sulfuric acid is the reaction medium and is in the range of −30° to 50° C., preferably in the range of −10° to 20° C. When the acid medium is polyphosphoric acid, the usual temperature range is from 50° to 150° C., preferably in the range of 70° to 110° C. The sulfuric acid system requires a lower reaction temperature because at temperatures over 50° C. the reaction mixture becomes discolored indicating a destruction of the reactants, whereas in the polyphosphoric system, discoloration does not occur until over 100° C. This discoloration is indicative of decomposition of the reactants, thus the maximum temperature of the present reaction is a point below the decomposition temperature of the reactants.

In carrying out the reactions of the present invention using sulfuric acid concentrations containing over 50 percent fuming sulfuric (i.e. 111.25° equivalent $H_2SO_4$) it is essential that unreacted dinitrile not be allowed to accumulate, since a reaction of nearly explosive violence can result.

Films produced according to the invention are flexible to brittle. Some films are flexible, but break on creasing. When the polymer is formed according to the present invention, it forms at bridgehead carbon atoms, thus the valences of the bridgehead carbon atom are satisfied by three carbon to carbon bonds and one carbon to nitrogen bond. This is a rather important feature of the present polymer. Since there is no tertiary hydrogen atom at these bridgehead positions, the polymers are not subject to destructive oxidation as are polymers of polypropylene polyvinylchloride poyvinylchloride for example.

The polyamides of the present invention show excellent stability to light. Polyamides produced from 5,7-dialkyladamantane particularly possess outstanding stability to light.

Films produced from the present polyamides are useful for packaging, particularly where long storage or display are involved, since the films do not tend to weaken appreciably and retain their full clarity.

The polymers of the present invention are also useful as insulating materials in electrical systems and components because of their excellent heat and light stability and low conductivity.

The polymers of the present invention can also be formed in sheets of from 0.1 to 0.5 centimeters thickness which are completely clear and colorless for use as building materials, for example, skylights and door panels, offering greater strength than glass of equal dimensions and better lasting properties than other polymer building materials presently available.

Two properties of the present polyamides that add to their attractiveness are high thermal stability and insolubility in conventional organic solvents. The polyamides have been found to be stable to temperatures of 200° to 250° C. for indefinite periods without the addition of stabilizers. The polyamides are insoluble in pentane, hexane, heptane, petroleum naphtha, petroleum ether, benzene, methanol, ethanol, formic acid, hydrochloric acid and the like.

The polymers of the present invention were observed to have very high glass transition temperatures as shown in Table I, and compared with the melting points of nylon 66[1] and Dacron[2]. The glass transition observations were made on powders or granules. A small amount of sample was placed on the heating stage of a micromelting point apparatus and observed through a magnifying lens. No change in the samples was observed up to 315 °C. (limit of apparatus) except for the adipo-polyamide which formed a melt at 300 °C.

[1] Nylon 66— 

obtained by the condensation of hexamethylene diamine with adipic acid.

[2] Dacron—E. I. du Pont de Nemours & Company trademark for polyester made from methyl terephthalate and ethylene glycol.

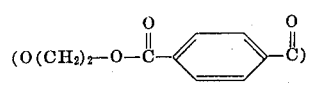

TABLE I

| Polymer type | Inherent viscosity | Glass transition, ° C. |
|---|---|---|
| (structure shown) | .72 | >300 |

TABLE I – Continued

| Polymer type | Inherent viscosity | Glass transition, °C. |
|---|---|---|
| 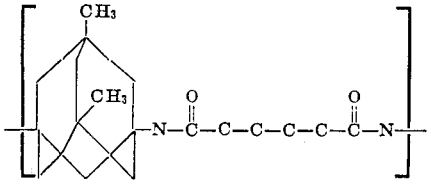 | .35 | 300 |
| 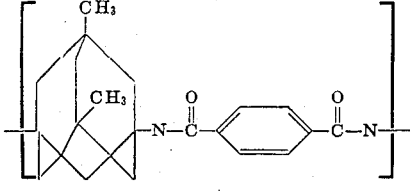 | .20 | >300 |
| 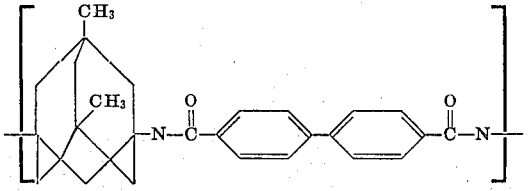 | .49 | >300 |
| 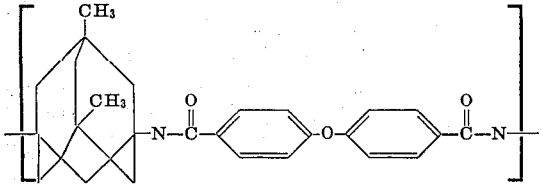 | .37 | >300 |
| —(NH(CH₂)₆NHC(O)—(CH₂)₄—C(O))— | ---------- | *250 |
| 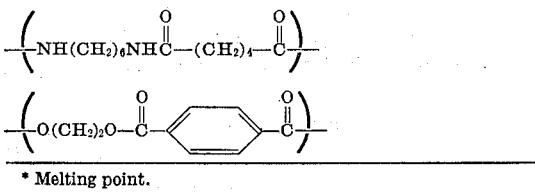 | ---------- | *250 |

* Melting point.

The following Examples are submitted to illustrate the invention and are not intended to limit its scope.

EXAMPLE I

To a stirred mixture of 30 ml. 20 percent fuming sulfuric acid and 25 ml. 96 percent sulfuric acid (100.6% $H_2SO_4$ equivalent) cooled to −20° C. were added portions of a mixture of 2.60 g. isophthalonitrile and 3.92 g. 1,3-dihydroxy-5,7-dimethyladamantane. The nearly colorless viscous mixture was allowed to warm to 25° C. after two hours. After 24 hours, the mixture was poured over ice, made alkaline with sodium hydroxide (ph>12) and filtered. The powdery polymer was mixed with water in a household blender and filtered. This process was repeated twice more with water and once with 50 percent acetone in methanol. The polymer was dried for 24 hours at 110° C. under vacuum. The resulting polymer was a white powder. η inherent (60 percent phenol in tetrachloroethylene solvent .469 percent concentration 100.0° F.) = 0.18.

EXAMPLE II

To 50 ml. of 20 percent fuming sulfuric acid (104.5 percent $H_2SO_4$ equivalent) cooled to 0° C. was added with stirring a mixture of 4.53 g. of oxydibenzonitrile and 3.93 g. of 1,3-dihydroxy-5,7-dimethyladamantane. The viscous orange-colored mixture was allowed to warm to 20° C. after five hours. After 24 hours, the mixture was poured over ice, and made alkaline with sodium hydroxide and filtered. The product was a solid chunk of polymer, which was broken in a household blender and washed and dried as in Example I. The resulting product was a white granular material. η inherent (60 percent phenol 40 percent tetrachloroethylene) = 0.37.

EXAMPLE III

To a stirred mixture of 23 ml. 20 percent fuming sulfuric acid and 12 ml. of $SO_3$ (approximately 111% $H_2SO_4$ equivalent) cooled to a slush was added a mixture of 2.0228 g. terephthalonitrile and 3.0368 g. of 1,3-dihydroxy-5,7-dimethly-adamantane. There was initial discoloration which cleared up on addition of more of the solid mixture. After 1.5 hours an additional 10 ml. of 20 percent fuming sulfuric acid was added to dilute the mixture reaction. The mixture was then poured over ice, washed and dried as in Example I. The resulting polymer was a white powder. η inherent = 0.20.

EXAMPLE IV

To 20 ml. of 20 percent fuming sulfuric acid (104.5% $H_2SO_4$ equivalent) cooled to −20° C. was added with stirring a mixture of 3.0293 g. 4,4'-dicyanobiphenyl and 2.8521 g. 1,3-dihydroxy-5,7-dimethyladamantane. The temperature of the viscous dark orange mixture was allowed to warm to 25° C. after two hours. After 24 hours, the mixture was poured over ice, washed, filtered and dried as in Example I. The product was a white granular polymer. Yield was 93 percent of theorical. $\eta$ inherent = .49, .51 (duplicate determinations).

EXAMPLE V

To a mixture of 0.1430 g. succinonitrile and 0.3501 g. 1,3-dihydroxy-5,7-dimethyladamantane cooled to 0° C. was added with stirring 10 ml. of 96 percent sulfuric acid followed by the addition of 5 ml. 20 percent fuming sulfuric acid (99.8% $H_2SO_4$ equivalent). After six hours the mixture was poured over ice, and allowed to stand in acidic solution for two weeks. The mixture was made alkaline with sodium carbonate, washed, filtered and dried as in Example I. Product was a white powder. $\eta$ inherent = 0.09. Infrared spectrum confirmed the identity of the expected polyamide product.

EXAMPLE VI

To a stirred mixture of 15 ml. 20 percent fuming sulfuric acid and 15 ml. 96 percent sulfuric acid (100.3% $H_2SO_4$ equivalent) cooled until slushy, was slowly added a mixture of 2.3892 g. fumaronitrile and 5.8887 g. 1,3-dihydroxy-5,7-dimethyladamantane. To this viscous clear mixture was added an additional 16 ml. of the 50/50 20 percent fuming and 96 percent sulfuric acid to reduce the viscosity. After five hours, the mixture was poured over ice, made alkaline, washed, filtered and dried as in Example I. The product was a white granular polymer, yield 96 percent of theorical. $\eta$ inherent = 0.72, 0.74 (duplicate determinations). Infrared and nuclear magnetic resonance confirmed the expected polyamide structure.

EXAMPLE VII

To a stirred mixture of 5 ml. 96 percent sulfuric acid and 5 ml. 20 percent fuming sulfuric acid (100.3 percent $H_2SO_4$ equivalent) at −20° C. was added 2.0099 g. 1,3-dihydroxy-5,7-dimethyl-adamantane. Slowly with stirring 1.1182 g. adiponitrile was added to the mixture with cooling. After 4.25 hours from the first adipontrile addition, the mixture was poured over ice, made alkaline, washed, filtered and dried as in Example I. The product was a white powder polymer. $\eta$ inherent = 0.08.

EXAMPLE VIII

To 20 ml. of stirred, 20 percent fuming sulfuric acid cooled to −20° C. was added 3.7060 g. 1,3-dihydroxy-5,7-dimethyladamantane. To this mixture was added 7 ml. of liquid $SO_3$ (total 109.4 percent $H_2SO_4$ equivalent). To this mixture was slowly added 2.0416 g. of adiponitrile with cooling and stirring. After 4.25 hours from the first adiponitrile addition, the mixture is poured over ice, made alkaline, washed, filtered and dried as in Example I. The product is a white granular polymer, yield 83 percent of theorical. $\eta$ inherent = 0.35.

EXAMPLE IX

To 50 ml. of 20 percent fuming sulfuric acid cooled to −10° C. was added with stirring a solid mixture of 1,3-dibromo-5,7-dimethyladamantane (6.44 g.) and 4,4'-dicyano-biphenyl (4.08 g.) over a period of 75 minutes. An initial yellow color darkened to orange then to dark red. The reaction was allowed to warm to 20° C. After 3.75 hours the mixture was poured over ice. Chunks of white polymer resulted. The polymer was chopped in a blender and filtered. The mixture was then made alkaline, washed, filtered, and dried as in Example I. The polymer was slightly off-white in color. $\eta$ inherent = 0.48.

EXAMPLE X

Polyphosphoric acid was prepared by adding $P_2O_5$ (70 g.) to 70 % $H_3PO_4$ (60 g.) and heating for one hour. 50 ml. of the above polyphosphoric acid was added to a mixture of 1,3-dihydroxy-5,7-dimethyladamantane (5.88 g.) and fumaronitrile (2.38 g.) over a 1 hour period with stirring. The mixture was heated to about 60° C. for 4 hours and then poured over ice. The mixture was made alkaline with NaOH and filtered (filtration of the resulting fine powder was very slow). The polymer was found to be contaminated with inorganic salts. It was necessary to dissolve the polymer in sulfuric acid and precipitate it by the addition of water to remove the inorganic salts. The polymer was made alkaline, washed, filtered and dried as in Example I. It is important when the polymer is dissolved in sulfuric acid for purification that the temperature of the mixture not be allowed to go above 50° C. The inherent viscosity of the polymer precipitated from sulfuric acid was $\eta$ inherent = 0.09.

EXAMPLE XI 1,3-Dichloro-5,7-dimethyladamantane (2.33 g = .0100 mole) was slowly added to 20 percent fuming sulfuric acid (104% $H_2SO_4$ equivalent) (50 ml) kept at 10° C and stirred magnetically. Fumaronitrile (0.80 g = .0103 mole) was slowly added and the mixture allowed to warm to room temperature and stir for 2 hours. The resulting mixture was poured over flaked ice (200 g). After the ice had melted, the white solid polymer was filtered from the liquid and washed twice with water (100 ml each), once with 5 percent sodium carbonate solution (150 ml), twice more with water (100 ml each), and twice with acetone (150 ml each). The polymer was dried at 80° C under vacuum for three hours. The yield was 3.04 g (97 percent of theory). The inherent viscosity was measured at 100° F at a concentration of 0.5 g/100 ml. in 60 percent phenol-40 percent tetrachloro-ethylene solvent. The inherent viscosity of this polymer was 0.65 dl/g.

EXAMPLE XII 1,3-Dihydroxy-5,7-dimethyladamantane (0.96 g = 0.0049 mole) was added to 20 percent fuming sulfuric acid (104% $H_2SO_4$ equivalent) (50 ml) at 10° C with stirring. After dissolution, sodium chloride (0.57 g = .0098 mole) was added, 1,3-dichloro-5,7,-dimethyladamantane was formed in situ. Then 4,4'-biphenyldicarbonitrile (1.00 g = 0049 mole) was added. The mixture was allowed to warm to room temperature (27°–28° C) and stirred for 4 hours. The mixture was then poured over ice and treated as in Example XI. The resulting polymer had an inherent viscosity at 100° F at a concentration of 0.5g/100 ml in 60 percent phenol-40 percent tetrachloroethylene of 0.24. The yield was 1.98 g (101 percent).

EXAMPLE XIII

Films were cast on a glass plate from a 15 percent solution of the polyamide of Example VI in trifluoroacetic acid solvent. The films were dried in air for 1 hour and heated to 190° C. under vacuum for 4 hours. The resulting films were clear, tough, flexible and could be creased several times without breaking.

The following Examples illustrate the criticallity of the concentration of sulfuric acid in the polymerization reaction of this invention.

EXAMPLE XIV

Four reactions were run identically, except that different concentrations of sulfuric acid were used, in a magnetically stirred 100 ml. Erlenmeyer flask kept at 5°–10 C for the course of the reaction. 1,3-Dihydroxy-5,7-dimethyladamantane (1.96 g = .0100 mole) was added slowly to the sulfuric acid (50 ml). After dissolution was complete, 4,4'-biphenyldicarbonitrile (2.04 g = 0.0100 mole) was added and the reaction mixture stirred for one hour. The solution was poured over flaked ice (200 g) and the resulting mixture (after the ice had melted) was filtered. The white solid retained on the glass filter was washed twice with 150 ml. portions of water and twice with 150 portions of acetone to remove unreacted monomers and oligomers such as dimer and trimer. The resulting polymer was dried in air. Its inherent viscosity was measured at 100° F at a concentration of 0.5 g/100 ml. in 60 percent phenol-40 percent tetrachloroethylene solvent. The results are given in Table I.

TABLE I

| Acid Strength % $H_2SO_4$ Equivalent | Polymer Isolated Wt. (g) | % of Theory | Inherent Viscosity dl/g |
|---|---|---|---|
| 96% | None | 0.0 | — |
| 98% | None | 0.0 | — |
| 100% | 1.23 | 30.8 | 0.04 |
| 104% | 2.84 | 71.0 | 0.08 |

EXAMPLE XV

Four reactions were run identically except that different concentrations of sulfuric acid were used. The acid (50 ml) was placed in a covered 100 ml. Erlenmeyer flask and cooled to 10° C. The mixtures were stirred magnetically throughout the reactions. 1,3-Dihydroxy-5,7-dimethyladamantane (1.96 g = .0100 mole) was added slowly to the sulfuric acid and after dissolution was complete 4,4'-biphenyldicarbonitrile (2.10 g = 0.0103 mole) was added. The mixture was allowed to warm to room temperature (29° C) and stir for 4 hours. After this time the yellow to red solutions were poured over flaked ice (200 g) and stirred. The solid white polymer was filtered out of the mixture using a sintered glass funnel and washed with water (twice with 100 ml each time), with 5 percent sodium carbonate solution (once with 150 ml), with water (twice with 100 ml. each time), and with acetone (twice with 150 ml. each time). The white solid was allowed to dry in air 3 days. The inherent viscosity of the solid was measured at 100° F as a solution of 0.5 g solid per 100 ml. of solvent (60 percent phenol-40 percent tetrachloroethylene). The results are shown in Table II.

TABLE II

| Acid Strength % $H_2SO_4$ Equivalent | Polymer Isolated Wt. (g) | % of Theory | Inherent Viscosity dl/g |
|---|---|---|---|
| 96% | 0.41 | 10.2 | 0.03 |
| 98% | 1.00 | 25.0 | 0.04 |
| 100% | 3.76 | 94.0 | 0.07 |
| 104% | 4.14 | 103.5 | 0.21 |

It is apparent from the data in Tables I and II that as the concentration of sulfuric acid increases the yield of the polyamide greatly increases and the quality of the polymer vastly improves. For example, at a concentration of about 99.5 percent $H_2SO_4$ equivalent, the yield of polyamide is over threefold over that of a concentration of 98 percent $H_2SO_4$ equivalent along with improved polymer characteristics. At a concentration of 104 percent $H_2SO_4$ equivalent the yield of polyamide is even more dramatic and improvement of polymer quality is substantial.

What is claimed is:

1. A process for producing polyamides which comprises reacting an organic dinitrile with an adamantane of the structure

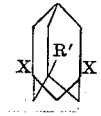

where R and R' are hydrogen or an alkyl radical having one to 20 carbon atoms, and X is selected from the group consisting of chloro, bromo and hydroxy at a temperature below the decomposition temperature of the reactants, in the presence of a strong acid selected from the group consisting of sulfuric acid having a concentration of 99.5 to 118% $H_2SO_4$ equivalent mixing the reaction mixture with water and separating the polyamide.

2. A process according to claim 1 wherein the sulfuric concentration is in the range of 100.1 to 111% $H_2SO_4$ equivalents acid and the temperature is in the range of −30° to 50° C.

3. The process according to claim 2 wherein the alkyl radicals of R and R' have one to 10 carbon atoms.

4. The process according to claim 3 wherein at least one of R and R' is alkyl.

5. The process according to claim 4 wherein R and R' are alkyl.

6. A process according to claim 2 wherein the temperature is in the range of −10° to 20° C.

7. A process according to claim 5 wherein said dialkyladamantane compound is 1,3-dihydroxy-5, 7-dimethyl-adamantane.

8. A process for producing polyamides which comprises reacting an organic dinitrile with 1,3-dibromo-5,7-dimethyl adamantane at a temperature below the decomposition temperature of the reactants, in the presence of a strong acid selected from the group consisting of sulfuric acid having a concentration of 99.5 to 118% $H_2SO_4$ equivalent and polyphosphoric acid, mixing the reaction mixture with water and separating the polyamide.

9. A process for producing polyamides which comprises reacting an organic dinitrile with 1,3-dichloro-5,7-dimethyl adamantane at a temperature below the decomposition temperature of the reactants, in the presence of a strong acid selected from the group consisting of sulfuric acid having a concentration of 99.5 to 118% $H_2SO_4$ equivalent and polyphosphoric acid, mixing the reaction mixture with water and separating the polyamide.

* * * * *